US010936750B2

(12) United States Patent
Gkoulalas-Divanis

(10) Patent No.: US 10,936,750 B2
(45) Date of Patent: *Mar. 2, 2021

(54) DATA DE-IDENTIFICATION ACROSS DIFFERENT DATA SOURCES USING A COMMON DATA MODEL

(71) Applicant: International Business Machines Corporation, Armonk, NY (US)

(72) Inventor: Aris Gkoulalas-Divanis, Waltham, MA (US)

(73) Assignee: International Business Machines Corporation, Armonk, NY (US)

(*) Notice: Subject to any disclaimer, the term of this patent is extended or adjusted under 35 U.S.C. 154(b) by 437 days.

This patent is subject to a terminal disclaimer.

(21) Appl. No.: 15/909,029

(22) Filed: Mar. 1, 2018

(65) Prior Publication Data

US 2019/0272387 A1    Sep. 5, 2019

(51) Int. Cl.
*G06F 21/62* (2013.01)
*G06F 21/57* (2013.01)
*G06F 21/60* (2013.01)
*G06F 16/21* (2019.01)

(52) U.S. Cl.
CPC ........ *G06F 21/6254* (2013.01); *G06F 16/214* (2019.01); *G06F 21/577* (2013.01); *G06F 21/604* (2013.01); *G06F 2221/034* (2013.01)

(58) Field of Classification Search
CPC .. G06F 21/577; G06F 21/604; G06F 21/6227; G06F 21/6254
See application file for complete search history.

(56) References Cited

U.S. PATENT DOCUMENTS

| 8,812,524 B2 | 8/2014 | Chen et al. |
| 9,349,026 B2 | 5/2016 | Gianniotis et al. |
| 9,760,718 B2 | 9/2017 | Braghin et al. |
| 2014/0075502 A1 | 3/2014 | Aissi et al. |

(Continued)

FOREIGN PATENT DOCUMENTS

WO    2010127216 A2    11/2010

OTHER PUBLICATIONS

De-Identification and Anonymization of Individual Patient Data in Clinical Studies—A Model Approach, TransCelerate BioPharma Inc., 2016.*

(Continued)

*Primary Examiner* — Minh Dinh
(74) *Attorney, Agent, or Firm* — Will Stock; SVL IP Law

(57) ABSTRACT

A computer system migrates and de-identifies data. Data is migrated from a dataset to a common data model that is configured to accommodate data comprising a plurality of different data types to be de-identified. Data is analyzed in the common data model to identify privacy vulnerabilities and determine corresponding data de-identification techniques and configuration options to be applied to the data. The automatically determined data de-identification techniques are applied to the data to address all of the identified privacy vulnerabilities, and the resulting de-identified data is migrated from the common data model back to the dataset. Embodiments of the present invention further include a computer-implemented method and program product for migrating and de-identifying data in substantially the same manner described above.

12 Claims, 8 Drawing Sheets

(56) References Cited

U.S. PATENT DOCUMENTS

| | | |
|---|---|---|
| 2014/0130178 A1 | 5/2014 | Agrawal et al. |
| 2015/0169895 A1* | 6/2015 | Gkoulalas-Divanis ...................... G06F 21/6254 726/26 |
| 2016/0012065 A1 | 1/2016 | Takata et al. |
| 2017/0177907 A1 | 6/2017 | Scaiano et al. |
| 2017/0243028 A1 | 8/2017 | LaFever et al. |
| 2019/0303619 A1 | 10/2019 | Gkoulalas-Divanis |

OTHER PUBLICATIONS

Appendix B—Concepts and Methods for De-identifying Clinical Trial Data, National Academy of Sciences, 2015.*

Liaw et al., "Secure Data Linkage and Information Sharing With GRHANITE™", HIC 2008 Australia's Health Informatics Conference, Health Informatics Society of Australia Ltd (HISA), ISBN 9780980552003, 2008, 7 pages.

"Anonymize Your Sensitive Data Automatically" (DOT Software; webinar), https://www.youtube.com/watch?v=VFS58A4ATTQ, video documentation retrieved from internet Feb. 2018, 2 pages.

"Anonymize your sensitive data, automatically", ARCAD, DOT Software, https://arcadsoftware.com/news-events/on-demand-webinars/webinar-anonymize-your-sensitive-data-automatically/ . . . , retrieved from internet Feb. 2018, 4 pages.

List of IBM Patents or Patent Applications Treated as Related, filed Jun. 20, 2019.

* cited by examiner

| ID | RELATIONAL DIRECT IDENTIFIERS | | | RELATIONAL QUASI-IDENTIFIERS | | | RELATIONAL SENSITIVE ATTRIBUTES | TRANSACTION ITEMS |
|---|---|---|---|---|---|---|---|---|
| | NAME | ADDRESS | SSN | BIRTHDATE | GENDER | ZIP CODE | REVENUE | LIST OF PURCHASED PRODUCTS |
| 0 | MARIA SMITH | 10 NY E. AVENUE | 473-57-8129 | 01/09/64 | FEMALE | 94139 | 800K | A B C D |
| 1 | JENNY VEEP | 5 BRIGHTON STREET | 472-37-1179 | 01/09/64 | FEMALE | 94138 | 600K | A B F |
| 2 | MARIA SPRING | 12 DOYLE AVE. | 423-67-8159 | 02/04/64 | FEMALE | 94138 | 3M | C D E G H |
| 3 | TOM McPAUL | 154 WEST END AV. | 123-50-8129 | 04/05/64 | MALE | 94139 | 150K | D |
| 4 | JOHN BOS | 93 SOMERS STR. | 533-53-8178 | 03/06/63 | MALE | 94139 | 2M | D E F |
| 5 | BOB ROOVE | 35 UNIVERSITY AV. | 832-39-8146 | 03/07/63 | MALE | 94138 | 8M | A F G H |

FIG.5

DATA DE-IDENTIFICATION ACROSS DIFFERENT DATA SOURCES USING A COMMON DATA MODEL

BACKGROUND

1. Technical Field

Present invention embodiments relate to data de-identification, and more specifically, to using a common data model to represent and de-identify data across different data sources, potentially originating from a variety of sectors such as retail, healthcare, telecommunications, banking, etc.

2. Discussion of the Related Art

Data de-identification refers to the practice of concealing personal information that appears in data to prevent a person's real identity from being connected to the personal information. Personal data is commonly de-identified in order to make use of the data for secondary purposes, while also preserving the privacy and anonymity of individuals. For example, medical data may be de-identified before it is used for clinical research purposes.

Often, data has to be de-identified in order to comply with specific privacy regulations. Since regulations may differ from country to country and from jurisdiction to jurisdiction, there are many different requirements that can be imposed on the collection, use, and protection of personal data. Furthermore, data that is deemed sufficiently de-identified in one jurisdiction may still be considered to be vulnerable in another jurisdiction. Meeting these privacy regulations while preserving data utility may require supporting a wide spectrum of data de-identification techniques.

SUMMARY

According to one embodiment of the present invention, a computer system migrates and de-identifies data. Data is migrated from a dataset to a common data model that is configured to accommodate the data to be de-identified from a plurality of different data types. Data is analyzed in the common data model to automatically identify privacy vulnerabilities and determine corresponding data de-identification techniques and configuration options to be applied to the data. The automatically determined data de-identification techniques are applied to the data to address all of the identified privacy vulnerabilities, and the resulting de-identified data is migrated from the common data model back to the dataset. Embodiments of the present invention further include a computer-implemented method and program product for migrating and de-identifying data in substantially the same manner described above.

BRIEF DESCRIPTION OF THE DRAWINGS

Generally, like reference numerals in the various figures are utilized to designate like components.

FIG. 5 is a block diagram depicting an example of a dataset in accordance with an embodiment of the present invention;

DETAILED DESCRIPTION

Figure 1:
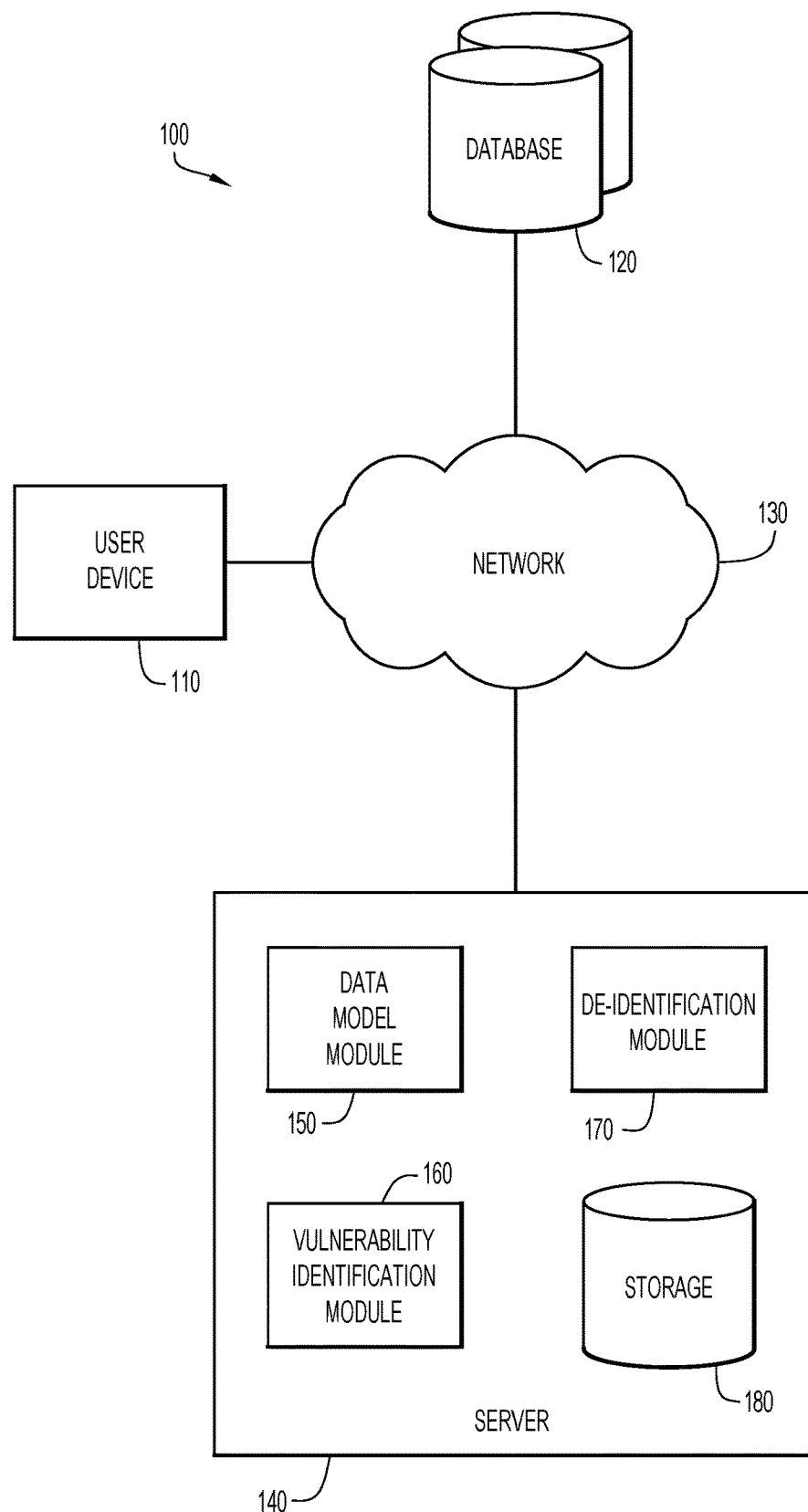
FIG. 1 is a block diagram depicting a computing environment for data de-identification in accordance with an embodiment of the present invention.

Present invention embodiments relate generally to data de-identification, and more specifically, to using a common data model to de-identify data. Personal data, or personally identifiable information (PIT), includes data that could potentially identify specific individuals. Data de-identification involves the data transformation of identifying features, such as direct identifiers and quasi-identifiers, to protect the individuals who are represented in the data from re-identification and other types of privacy attacks, such as sensitive information disclosure, membership disclosure and inferential disclosure. Direct identifiers, also known as personal identifiers, may immediately identify entities without requiring any other information. For example, direct identifiers may include a full name, social security number, telephone number, email or residential address, or other national identifiers. Quasi-identifiers are pieces of information that alone are not sufficient to re-identify an individual, but in combination with other features of the data may provide sufficient information to enable an attacker to uniquely identify an entity. Thus, quasi-identifiers can indirectly identify an individual. For example, the combination of the five-digit zip code where a person lives, together with gender information and the date of birth of the individual, have been shown to be sufficient to re-identify a large portion of the population of the United States.

Due to privacy regulations and other requirements, it may be necessary to de-identify data according to different privacy standards, such as the Health Insurance Portability and Accountability Act (HIPAA) and the Family Educational Rights and Privacy Act (FERPA) in the United States, and the General Data Protection Regulation (GDPR) in the European Union. At the same time, data de-identification algorithms are largely data type-specific and domain-agnostic, meaning that the same algorithms can only be applied to similar types of data coming from different industries (such as telecommunications, retail, healthcare, banking, etc.). In these cases, several modules, each specific to a corresponding data type, would be needed to de-identify the different data types that may co-occur in a dataset. Such data type specific algorithms may further be combined to allow protection of data from attackers who have background knowledge that spans across data types (e.g., an attacker that knows certain demographic information along with medical diagnoses codes associated with a patient). Embodiments of the present invention may de-identify data by migrating proprietary datasets to a common data model, discovering privacy vulnerabilities in the data (potentially based on the requirements of the particular legal framework that needs to be supported by the protected data), and applying the appropriate data de-identification methods to transform the data in a way that protects individuals from privacy threats, such as re-identification based on direct and/or quasi identifiers. Thus, any de-identification technique that is compatible with data types represented under the common data model may be applied to data from any dataset that contains such data types, regardless of the dataset's format. Since each dataset format does not require its own ad hoc algorithm in order to be de-identified, embodiments of the present invention significantly reduce the complexity and number of data de-identification modules required to be executed and stored to de-identify any data, thus reducing processing time and storage requirements. At the same time, only the features of a dataset that need to be privacy-protected are represented under the common data model, thereby reducing the computational, communication, and storage cost of data migration and processing for de-identification. A de-identification module may be applied to any dataset regardless of the data type or format.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Present invention embodiments will now be described in detail with reference to the Figures. FIG. 1 is a block diagram depicting a computing environment 100 for data de-identification in accordance with an embodiment of the present invention. As depicted, computing environment 100 may include a user device 110, a database 120, a network 130, a server 140, a data model module 150, a vulnerability identification module 160, a de-identification module 170, and storage 180.

User device 110 may include a laptop computer, a tablet computer, a netbook computer, a personal computer (PC), a desktop computer, a personal digital assistant (PDA), a smart phone, a thin client, or any programmable electronic device capable of executing computer readable program instructions. A user may provide datasets to be de-identified to database 120 using user device 110. A user may also interact with de-identified data using device 110. In some embodiments, the user of user device 110 is the data owner of datasets that are de-identified according to embodiments of the subject invention. User device 110 may include internal and external hardware components, as depicted and described in further detail with respect to FIG. 7.

Database 120 may include any non-volatile storage media known in the art. For example, database 120 can be implemented with a tape library, optical library, one or more independent hard disk drives, or multiple hard disk drives in a redundant array of independent disks (RAID). Similarly, data on database 120 may conform to any suitable storage architecture known in the art, such as a file, a relational database, an object-oriented database, and/or one or more tables.

Database 120 may store datasets (such as proprietary datasets that are provided by a data owner) or data from such datasets that has been migrated to a common data model. Data in database 120 may include data that has not yet been de-identified or data that has been de-identified according to one or several standards. A user may interact with data stored on database 120 via user device 110.

Network 130 may include a local area network (LAN), a wide area network (WAN) such as the Internet, or a combination of the two, and includes wired, wireless, or fiber optic connections. In general, network 130 can be any combination of connections and protocols that will support communications between user device 110, database 120, and server 140 in accordance with embodiments of the present invention.

Server 140 may include data model module 150, vulnerability identification module 160, de-identification module 170, and storage 180. In general, server 140 and its modules migrate datasets to a common data model, analyze the data in the data model for potential vulnerabilities (e.g., features that alone, or in combination, could be used to re-identify individuals), perform data de-identification, and migrate the de-identified data back to the dataset format. Server 140 may access database 120 or user device 110 in order to migrate data to or from the common data model. Server 140 may include internal and external hardware components, as depicted and described in further detail with respect to FIG. 7.

Data model module 150, vulnerability identification module 160, and de-identification module 170 may include one or more modules or units to perform various functions of present invention embodiments described below. The modules may be implemented by any combination of any quantity of software and/or hardware modules or units.

Data model module 150 may migrate data from a dataset to a common data model and back again. Data model module 150 may utilize user input (e.g., from user device 110) and/or schema mapping technology in order to determine aspects (e.g., rows, columns) of a dataset that may correspond to tables of a common data model. Data model module 150 may access a dataset that is stored on user device 110, database 120, or storage 180. When data model module 150 migrates data from a dataset to a common data model, the data may be stored in user device 110, database 120, or storage 180. In some embodiments, data model module 150 migrates a dataset in database 120 to a common data model that is stored in storage 180.

Vulnerability identification module 160 may analyze data in a common data model in order to discover a variety of privacy vulnerabilities that may exist in the dataset, such as identifying features of the data (i.e., direct and indirect identifiers) and sensitive features of the data (e.g., salary or disease information). In some embodiments, vulnerability identification module 160 determines how data may be vulnerable to particular re-identification attacks, sensitive information disclosure attacks, membership attacks, and inferential disclosure attacks. Vulnerability identification module 160 may automatically discover direct identifiers and quasi-identifiers in the data. Vulnerability identification module 160 may identify vulnerabilities on the basis of the privacy regulations or standards to which the de-identified data is expected to adhere. In some embodiments, vulnerability identification module 160 receives a user selection from user device 110 of the privacy regulations or standards to be applied; vulnerability identification module 160 may search for vulnerabilities that are specific to the user-selected regulations or standards. Upon discovering vulnerabilities such as direct identifiers, quasi-identifiers, and sensitive attributes, vulnerability identification module 160 may output the discovered vulnerabilities to de-identification module 170 or storage 180.

Figure 2:
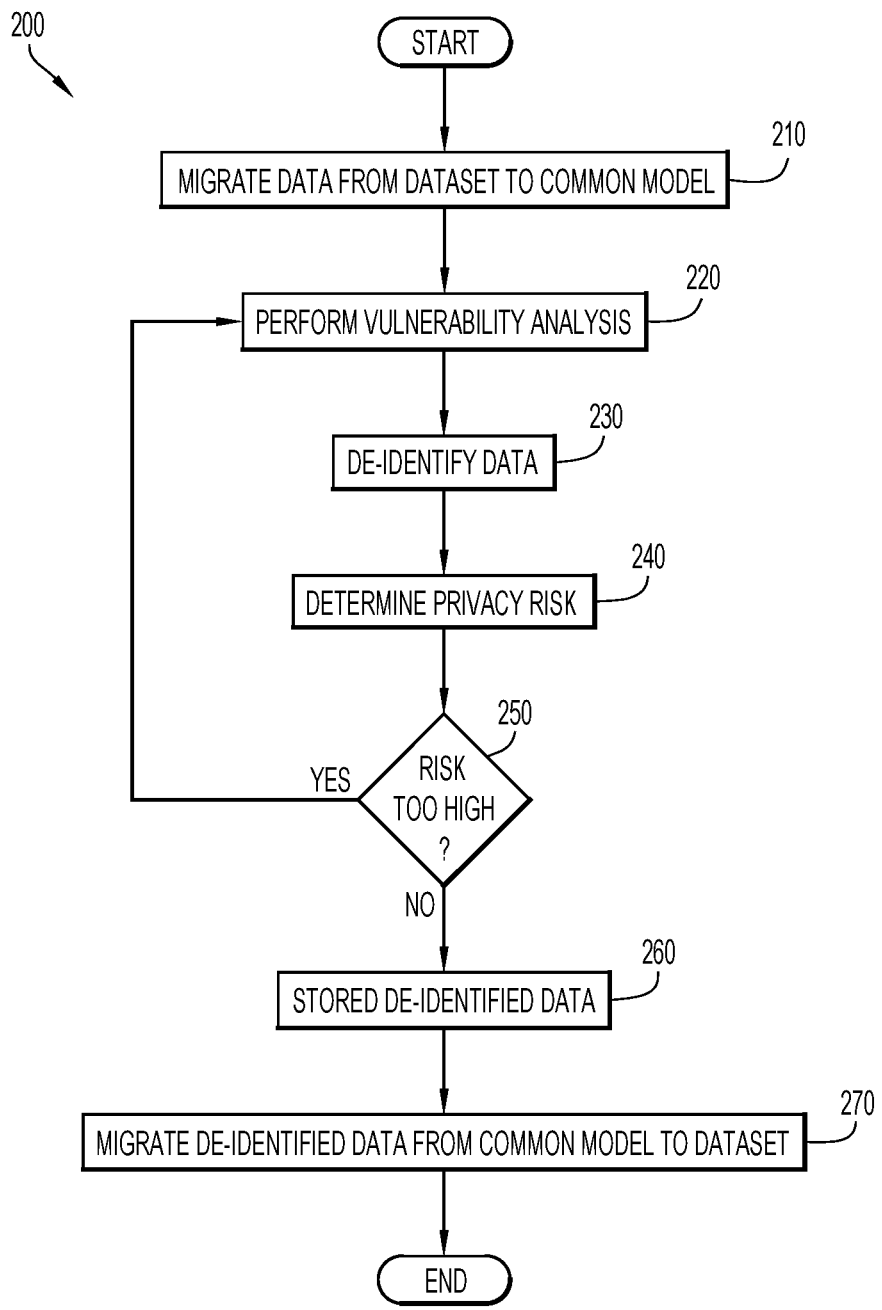
FIG. 2 is a flow chart depicting a method of de-identifying data in accordance with an embodiment of the present invention.

De-identification module 170 may determine which de-identification techniques to apply to data according to the privacy vulnerabilities identified by vulnerability identification module 160. In some embodiments, de-identification module 170 applies de-identification techniques that are known to overcome vulnerabilities that were identified by vulnerability identification module 160. For example, de-identification module 170 may de-identify direct identifiers by performing (utility-preserving) data masking, which replaces some of the data with structurally similar, but inauthentic, data. De-identification module 170 may protect quasi-identifiers by applying data generalization or suppression techniques; in data generalization, original values are abstracted to more general values, whereas data suppression refers to the deletion of certain values from the data. De-identification module 170 may also employ other de-identification techniques (which may adhere to a formal privacy model, such as k-anonymity, 1-diversity, $k^m$-anonymity, set-based anonymization, etc.), such as those employed at operation 230 of de-identification method 200 (FIG. 2). De-identification module 170 may output de-identified data to storage 180 or database 120. Thus, de-identification module 170 may produce data that is de-identified according to the requirements of the privacy regulations to which the data is expected to conform. Additionally, de-identification module 170 may retain the utility of the data based on user-provided information about the expected use of the de-identified data, such as whether the data will be used to support a particular analytic task (e.g., building a classifier, performing data clustering, etc.).

Storage 180 may include any non-volatile storage media known in the art. For example, storage 180 can be implemented with a tape library, optical library, one or more independent hard disk drives, or multiple hard disk drives in a redundant array of independent disks (RAID). Similarly, data stored in storage 180 may conform to any suitable storage architecture known in the art, such as a file, a relational database, an object-oriented database, and/or one or more tables. In some embodiments, de-identified data is output to storage 180 and then migrated to database 120.

FIG. 2 is a flow chart depicting a method 200 of de-identifying data in accordance with an embodiment of the present invention.

Data is migrated from a dataset to a common data model at operation 210. In some embodiments, data is migrated using data model module 150. Data may be migrated from a dataset having a proprietary format to the common data model. For example, in a dataset provided by a user, the arrangement and organization of data in each column or category may be proprietary. A common data model may store data on the basis of its data type; for example, a common data model may store all relational direct identifiers, such as names, telephone numbers, national identifiers, email and postal addresses, found in a dataset in one table of the common data model, regardless of how many different categories or tables these relational direct identifiers may have spanned in the source dataset. Similarly, the common data model may store all relational quasi-identifiers in another table of the common data model. Data may be migrated according to instructions from a user of user device 110; for example, a data owner may assign a particular data table, row, column, etc., in the dataset to one or more tables in the common data model. In some embodiments, data may be automatically migrated by applying schema matching techniques, in which objects are identified as semantically related. For example, given two schemas DB1.Student (Name, Level, Major, Marks) and DB2.Student (Name, Major, Grades), DB1.Name may correspond to DB2.Name, and DB1.Marks may correspond to DB2.Grades. Schemas may be matched according to a matching engine that may determine matches based on similarity scores and/or other metrics or attributes. For example, the matching engine may employ various matching techniques to match data attributes or other characteristics, such as exact matching, partial matching, probabilistic matching, matching of data and/or metadata, etc. In some embodiments, not all the data from the dataset may be migrated to the common data model, but only data that is relevant for de-identification.

Schema matching may employ a machine learning engine using machine learning to provide additional metrics, attributes, and/or recommendations. The machine learning engine may be trained to determine matches based upon prior matches or recommendations and corresponding metrics and attributes. The machine learning engine may employ various models to perform the learning (e.g., neural networks, mathematical/statistical models, classifiers, etc.). In some embodiments, data is migrated from a dataset to a common data model by a combination of user assignments and schema matching.

During migration, data from a dataset is mapped to categories of the common data model, such as a relational data category, a trajectory data category, a sequence data category, and a transaction data category. The relational data category may include a table for common direct identifiers, a table for common quasi-identifiers, a table for common and user-defined sensitive attributes (e.g. an individual's salary, diseases an individual may have), and a table for other relational attributes. The direct identifiers and quasi-identifiers tables may include identifiers that are identifiable as such, or are identified by the data owner; direct and quasi-identifiers may still be present in tables outside of the direct and quasi-identifiers table.

Trajectory or user mobility data may include a table for sensitive locations visited by individuals and a table of user trajectories. Sensitive locations may include locations indicated as sensitive by an entity such as the data owner as well as well-known locations that individuals may not want to be associated with, such as a hospital, clinic, or police station. User trajectories may describe individuals' location history by listing the locations of individuals at particular times. Locations may be described by geographic coordinates such as latitude and longitude, names of locations such as "university" or "super-market," or by other descriptors, and are accompanied by temporal information about the time of visit.

Sequence data may include a table for sensitive sequence data and a table for user sequences. Sensitive sequence data may include data that is indicated as sensitive by an entity such as the data owner. Sequence data may include sequences such as environmental data that changes over time (e.g., atmospheric pressure, temperature, precipitation), sequences of queries in a search engine, purchase history of customers, web browsing activity of individuals, history of events/measurements generated by a sensor, history of locations visited by an individual, and the like.

Transactional data may include a table for sensitive transaction items and a table for user transactions. Sensitive transaction items may include transactions or selections that are indicated as sensitive by an entity such as the data owner, such as purchases of prescription medication or medical diagnosis codes associated with a patient. User transactions may include items or sets of items that an individual has selected (e.g., purchases).

When data is migrated from a dataset to a common data model, the storage location may change as well; for example, data residing on database 120 may be migrated to storage 180. Data from a dataset may be transferred from database 120 to storage 180 before or after the dataset is mapped from its native format into the common data model format.

For each quasi-identifier (e.g., relational, transactional, sequence, location, etc.), a domain generalization hierarchy may be specified. A domain generalization hierarchy may define how data values can be generalized. For example, a birth date may be generalized to a month and year, and further generalized to simply a year. Similarly, the domain generalization hierarchy for a telephone number may be a ten-digit number (e.g., 123-456-7890), which may be generalized to an area code and telephone prefix (e.g. 123-456-XXXX), and further generalized to the area code only (e.g., area code 123). Domain generalization hierarchies may be provided for each data type in the common data model. Domain generalization hierarchies may be pre-defined or provided by a data owner. In some embodiments, data in the common data model is generalized per data type using domain generalization hierarchies before the data is analyzed for vulnerabilities at operation 220.

Data in the common data model is analyzed for vulnerabilities at operation 220. Vulnerabilities may be identified by vulnerability identification module 160. Vulnerabilities may not only be identified in tables that are designated as sensitive (e.g., direct identifiers, quasi-identifiers, relational sensitive attributes, sensitive locations, sensitive sequences, and sensitive transaction items), but in any table of the common data model. In some embodiments, vulnerabilities are identified by searching for combinations of attributes' values that describe only a few records. For example, if a combination of values for the attributes of birth date, five-digit zip code, and product purchases indicates only one record of the dataset, then those attributes in combination can be considered to be quasi-identifiers. Direct identifiers that avoided classification into the direct identifier table during data migration (operation 210) may also be identified as vulnerabilities. Similarly, sensitive data that is not classified in a corresponding "sensitive" table may be considered a vulnerability. When analyzing the data model for attributes that in combination form quasi-identifiers, vulnerability identification module 160 may compare attributes within a single table or compare attributes from multiple tables.

Data is de-identified at operation 230. Data may be de-identified as per the requirements of a selected legal privacy framework (e.g., HIPAA Safe Harbor, HIPAA Expert Determination, GDPR pseudonymization, GDPR anonymization, etc.), or by general data de-identification approaches. Forms of de-identification may include data generalization, data suppression, data masking, support of a privacy model such as k-diversity, l-diversity, $\rho_1$-to-$\rho_2$ privacy, $\varepsilon$-differential privacy, $k^m$-anonymity, set-based anonymization, RT-anonymity, or any other data de-identification methodology or combination thereof. De-identification module 170 may de-identify data using algorithms adapted specifically to de-identify data that is stored in the common data model. Any de-identification algorithm that is compatible with the common data model can be applied to any dataset upon migration of the dataset to the common data model. Data generalization hierarchies that are supported by the common data model may be used in data generalization operations performed by the data de-identification approaches. Additionally, utility-preserving operations may be supported by the applied data de-identification algorithms to allow the de-identified data to retain maximal utility in supporting intended types of analysis. De-identification algorithms may be stored in storage 180 of server 140.

Subsequent to de-identifying the data in the common data model, the privacy risk of the data is evaluated at operation 240. In some embodiments, the privacy risk may be calculated as a privacy score and compared to a threshold. Privacy risk may be determined according to the size of the smallest equivalence class (e.g., the number of records having the same values for the quasi-identifiers) that was produced during de-identification. The privacy regulation or guideline that is selected by the data owner may dictate the threshold or passing score for a privacy score.

If it is determined at operation 250 that the data in the common model has too high of a risk score, then de-identification method 200 loops back to operation 220, and the data is further anonymized using other de-identification techniques (or more rigorous versions of the previously-applied de-identification techniques). Thus, de-identification method 200 may iterate until the data is sufficiently de-identified. Upon determining that the data has been de-identified sufficiently, method 200 may proceed to operation 260.

The de-identified data is stored at operation 260. The de-identified data may be output by de-identification module 170 and stored in the format of the common data model in storage 180 or database 120. In operation 270, the de-identified data may be migrated from the common data model to a dataset format using data model module 150. In some embodiments, the de-identified data is restored to its original dataset representation. Thus, a data owner may access the de-identified data in the same native format in which the data owner provided the dataset.

Figure 3:
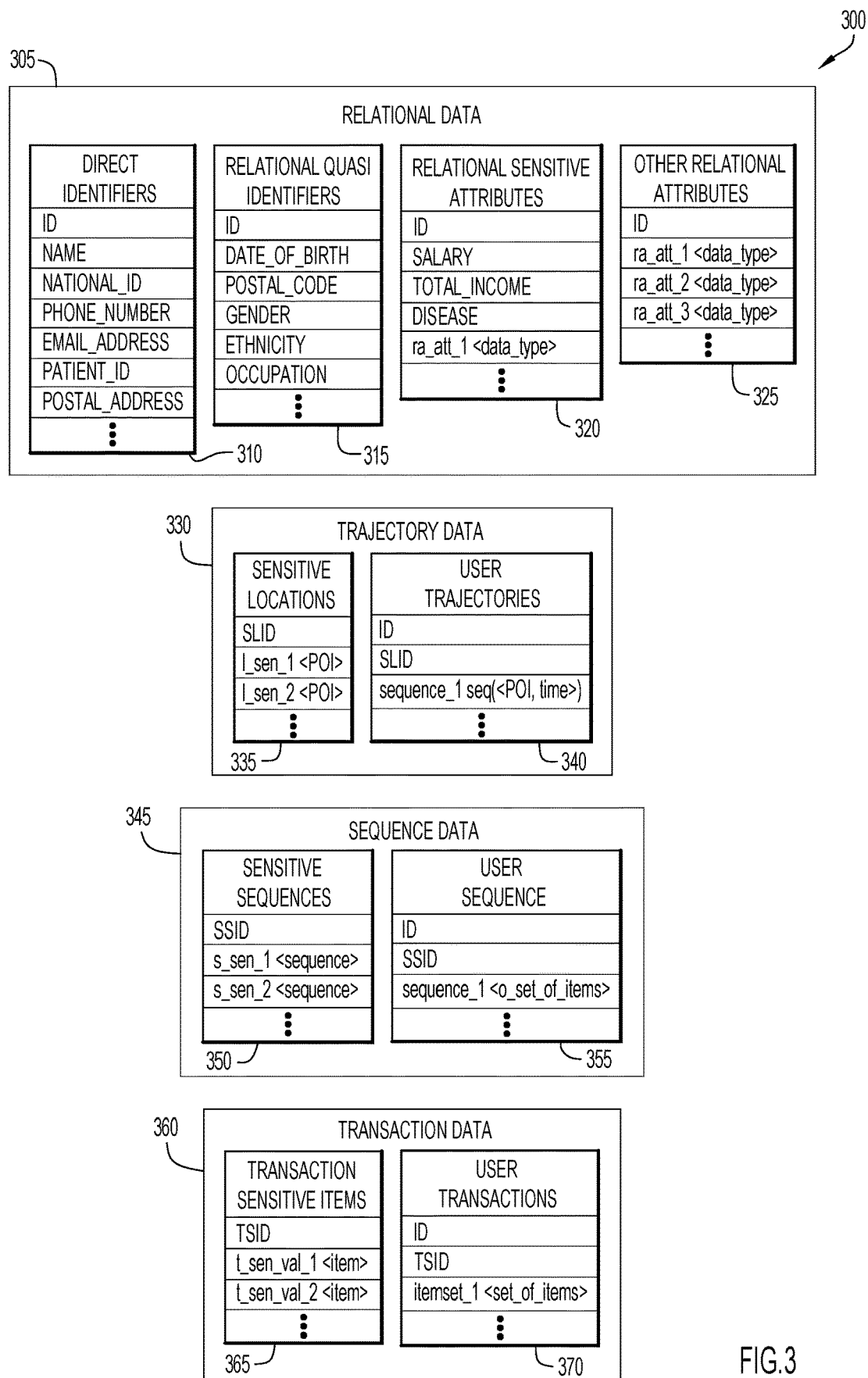
FIG. 3 is a block diagram depicting an example of a common data model in accordance with an embodiment of the present invention.

FIG. 3 is a block diagram depicting an example of a common data model 300 in accordance with an embodiment of the present invention. As depicted, common data model 300 includes relational data 305, direct identifiers table 310, relational quasi-identifiers table 315, relational sensitive attributes table 320, other relational attributes table 325, trajectory data 330, sensitive locations table 335, user trajectories table 340, sequence data 345, sensitive sequences table 350, user sequences table 355, transaction data 360, transaction sensitive items table 365, and user transactions table 370. Each data record in a source dataset may be assigned its own identification (ID) number under the common data model. Because a common data model is consistent in its format, de-identifying (and vulnerability-detecting) algorithms need only be compatible with the common data model in order to de-identify data or detect vulnerabilities; as long as data is properly migrated from a dataset into a common data model, the same algorithms can de-identify data regardless of the format of the source dataset(s) and regardless of the industry sector (e.g., healthcare, retail, telecommunications, etc.) from which the data originates. Due to the differences between proprietary datasets, traditional data de-identification techniques typically require a unique, ad hoc de-identification to be developed for each dataset. This may consume more computational resources (e.g., storage, processing) compared to embodiments of the present invention, which offer universal de-identification algorithms that are agnostic as to the source dataset's format. Additionally, only those features of the source dataset which correspond to personal and sensitive information, and have to be de-identified, need to be migrated to the common data model, which significantly reduces processing and storage requirements.

Relational data 305 may include data that follows a relational data model, where each individual is represented as a data record and is associated with a number of attributes, each of which has one data value. For example, an individual may have one name, one social security number, one home postal address, etc. Each individual may be tracked in a common data model according to an ID number. Relational direct identifiers table 310 may include identifiers whose values directly point to an individual, such as the individual's name, national identification number (social security number, etc.), phone number, email address, patient identification number, and postal address. Relational quasi-identifiers table 315 may include quasi-identifiers, such as date of birth, postal code, gender, ethnicity, occupation, and other biographical details that may identify a particular individual when considered with one or more other quasi-identifiers.

Relational sensitive attributes table 320 may include relational attributes deemed sensitive, such as an individual's salary, total income, diseases that the individual may have, etc. Other relational attributes table 325 may include other attributes that the data owner (or the schema matching approach that was used) was not able to classify as direct identifiers, relational quasi-identifiers, or relational sensitive attributes. Hence, after data migration, these attributes do not belong to direct identifiers table 310, relational quasi-identifiers table 315, or relational sensitive attributes table 320. Data from a dataset is migrated to one or more of these tables during migration operation 210 according a data owner's assignments and/or schema matching; thus, there may be relational quasi-identifiers in other tables (e.g., in relational sensitive attributes table 320 or other relational attributes table 325) outside of relational quasi-identifiers table 315. After data migration, data stored to other relational attributes table 325 will be analyzed by vulnerability identification module 160 in order to discover if some of these attributes should be classified as direct identifiers (and hence be moved to direct identifiers table 310), as relational quasi-identifiers (and hence be moved to relational quasi-identifiers table 315), or as relational sensitive attributes (and hence be moved to relational sensitive attributes table 320). Any data elements that will remain to other relational attributes table 325 will be treated as non-identifiers, and as such, will not be de-identified at operation 230.

Trajectory data 330 may include sensitive locations table 335 and user trajectories table 340. Sensitive locations table 335 may include locations indicated as sensitive by an entity such as the data owner. For example, a visit to a physician or a financial advisor may be considered sensitive. User trajectories table 340 may include an individual's movement history by listing locations visited along with the time or duration of the visit. An individual's location may be determined in a variety of ways; in some embodiments, an individual's mobile device provides location information using a global positioning system. Sensitive locations table 335 and user trajectories table 340 may contain transactional quasi-identifiers; for example, part of a daily route of a courier may be unique to one individual.

Sequence data 345 may include sensitive sequences table 350 and user sequence table 355. Sequence data 345 may include sequences such as environmental data that changes over time (e.g., atmospheric pressure, temperature, precipitation), sequences of queries in a search engine, purchase history of customers, web browsing activity of individuals, history of events/measurements generated by a sensor, history of locations visited by an individual, and the like. Sensitive sequence table 350 may include data that is indicated as sensitive by an entity such as the data owner. For example, an individual's web browsing activity or order of sites visited may be sensitive. User sequence table 355 may include sequences not initially indicated as sensitive; however, user sequence table 355 may contain quasi-identifiers.

Transaction data 360 may include transaction sensitive items table 365 and user transactions table 370. Transaction sensitive items table 365 may include transactions or selections that are indicated as sensitive by an entity such as the data owner, such as specific diagnosis codes or purchases of prescription medication. User transactions table 370 may include transactions by an individual. Because a dataset may contain more than one transaction attribute, each item set in user transactions table 370 may also be assigned a unique transaction identification (TSID).

Figure 4:
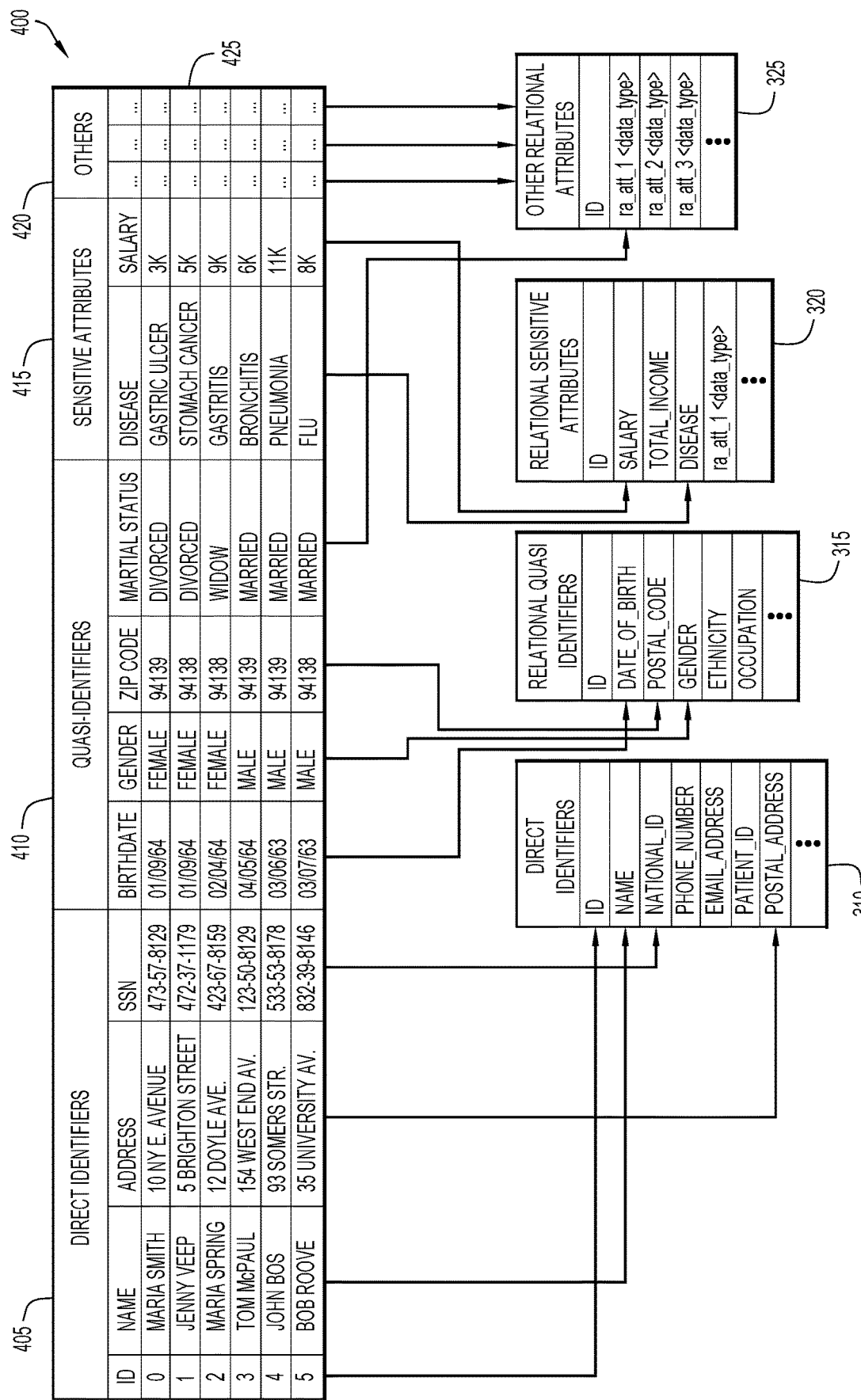
FIG. 4 is a block diagram depicting an example of representing a dataset under a common data model in accordance with an embodiment of the present invention.

FIG. 4 is a block diagram depicting an example of mapping a dataset to a common data model 400 in accordance with an embodiment of the present invention. As depicted, dataset 400 includes direct identifiers 405, quasi-identifiers 410, sensitive attributes 415, and other attributes 420. The common data model stores this information in a number of tables. Specifically, the name, address, and social security number (SSN) information of the individuals is stored in the relational direct identifiers table 310 of the common data model. Similarly, birthdate, gender, zip code, and marital status, are relational quasi-identifiers and are stored in relational quasi-identifiers table 315 of the common data model. Disease and salary information that is part of the original dataset is sensitive information and is therefore stored in relational sensitive attributes table 320 of the common data model. Any other relational data attributes in the original dataset are stored to the other relational attributes table 325.

Data may be mapped from a dataset to a common data model, such as common data model 300, during a migration, such as in operation 210 of method 200. A data owner may assign data from the dataset to one or more tables of a common data model. As depicted, the direct identifiers "NAME," "ADDRESS," and "SSN" are migrated from a source dataset to direct identifiers table 310 fields "NAME," NATIONAL_ID" and "POSTAL_ADDRESS," respectively. The identification number of each entry is also consistently migrated from each row of a dataset to each row in common data model 300. The data owner may recognize that birthdate, gender, and zip code are quasi-identifiers, because knowledge of all three can uniquely describe one individual in the depicted example. Birthrate, gender, and zip code may be assigned to relational quasi-identifiers table 315. Optionally, during the data migration, data may be filtered through hierarchies (e.g., a five-digit zip code may be reduced to only the first two or three digits).

Dataset attributes in the sensitive attributes 415 category, such as "DISEASE" and "SALARY," may be mapped to relational sensitive attributes table 320. Other attributes 420 may be mapped to other relational attributes table 325, which may store miscellaneous attributes that are not classified into any of the other categories.

FIG. 5 is a block diagram depicting an example of a dataset 500 in accordance with an embodiment of the present invention. As depicted, dataset 500 includes relational direct identifiers 505, relational quasi-identifiers 510, relational sensitive attributes 515, and a transaction attribute that stores purchased products 520. In order to provide the data in dataset 500 to researchers, the data may first need to be de-identified. Dataset 500 may be divided into two parts: a relational part that includes all of the relational data (e.g. data in the "NAME" through "REVENUE" columns), and a transaction part that includes only the transactional data (e.g. data in the "PRODUCTS" column). Other datasets may be divided similarly into parts such as relational data, trajectory data, sequence data, and transaction data. Once a data owner classifies parts of a dataset, the data owner may begin mapping dataset features to tables in a common data model so that the data may be migrated.

Figure 6A:
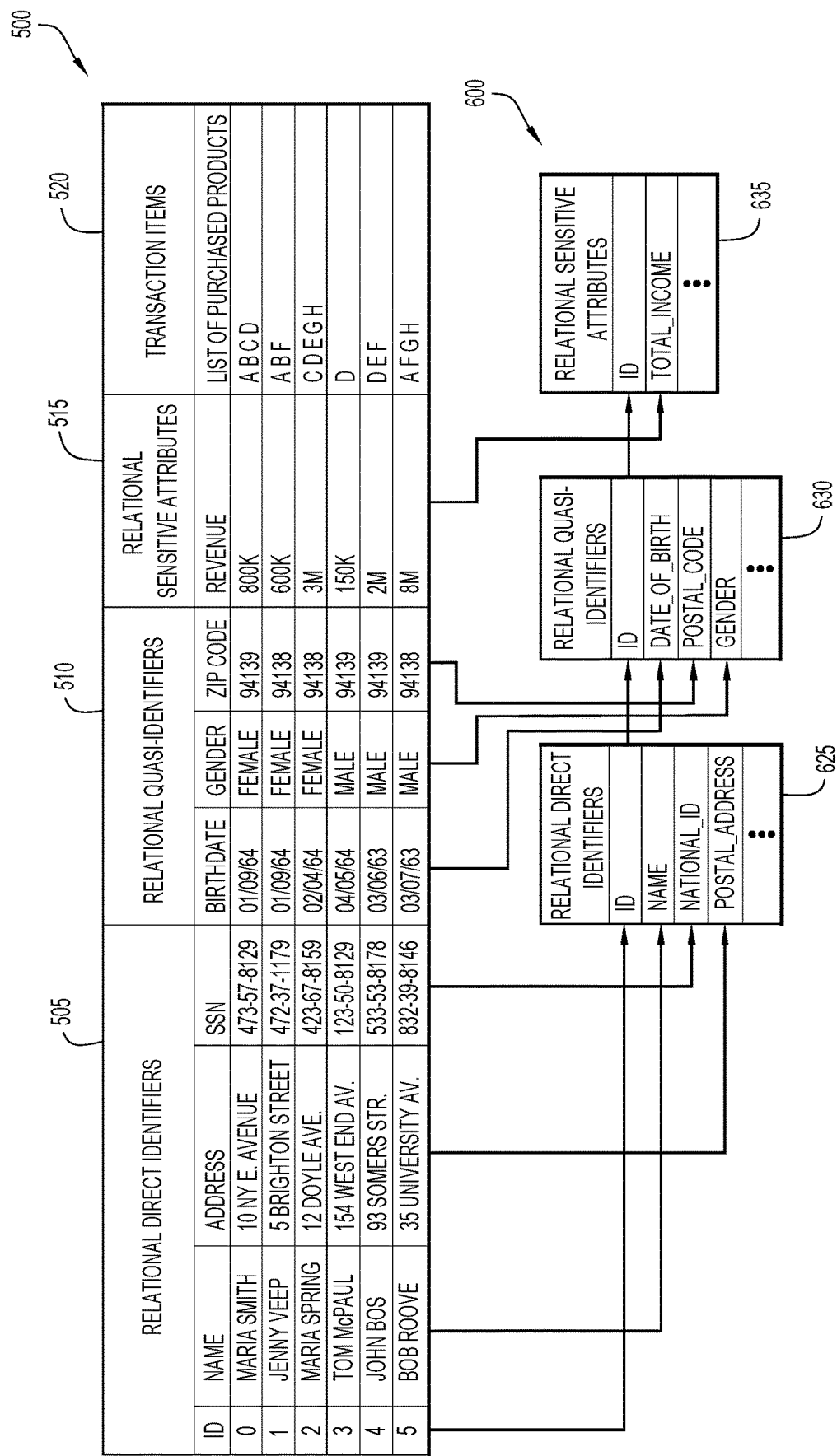
FIGS. 6A-6B are a block diagram depicting an example of mapping the dataset of FIG. 5 to a common data model in accordance with an embodiment of the present invention.
Figure 6B:
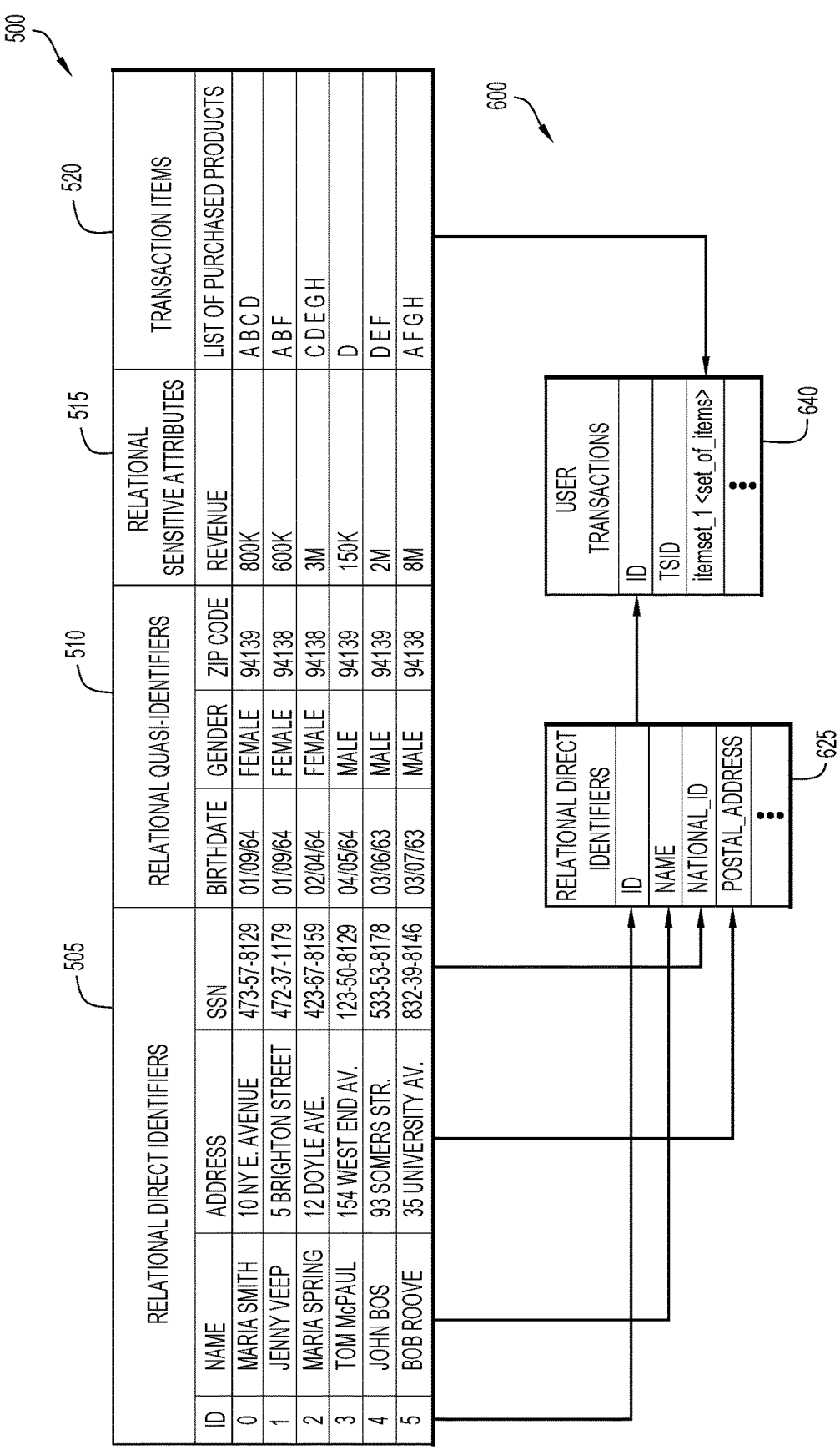

FIGS. 6A-6B are a block diagram depicting an example of mapping dataset 500 to a common data model 600 in accordance with an embodiment of the present invention. Data model 600 is substantially similar to data model 300 described above. FIG. 6A depicts mapping of the relational part of a dataset, and FIG. 6B depicts the mapping of a transaction part of a dataset. Other datasets may be divided similarly into parts such as relational data, trajectory data, sequence data, and transaction data, so that the dataset may be mapped accordingly to a common data model.

FIG. 6A depicts relational direct identifiers 505, relational quasi-identifiers 510, relational sensitive attributes 515, and a transaction attribute storing information about purchased products 520, of a source dataset, along with direct identifiers table 625, relational quasi-identifiers table 630, and relational sensitive attributes table 635 of a common data model. The elements of dataset 500 may be mapped to one or more tables of a common data model (e.g. direct identifiers table 625, relational quasi-identifiers table 630, and relational sensitive attributes table 635). For example, "NAME," "SSN," and "ADDRESS," and columns of direct identifiers 505 may be mapped to "NAME," NATIONAL_ID," and "POSTAL_ADDRESS" respectively of direct identifiers table 625. Quasi-identifiers 510 and sensitive attributes 515 may similarly be mapped to relational quasi-identifiers table 630 and relational sensitive attributes table 635.

FIG. 6B depicts relational direct identifiers 505, relational quasi-identifiers 510, relational sensitive attributes 515, and transaction attribute storing information about purchased products 520, of a source dataset, along with direct identifiers table 625, and user transactions table 640 of a common data model. A data owner may map transactional data to a common data model. For example, the list of purchased items of an individual in the source dataset, recorded in column "PRODUCTS" 520, may be mapped to user transactions table 640 as an entry such as "itemset_1."

Once data from dataset 500 is mapped to a common data model, data may be migrated into the common data model for vulnerability analysis and de-identification. De-identified data may then be migrated back into original dataset 500 by reversing the migration process (except with data that is now de-identified). Data may be migrated to a common data model, analyzed for vulnerabilities, de-identified, and migrated back to the dataset according to de-identification method 200.

Figure 7:
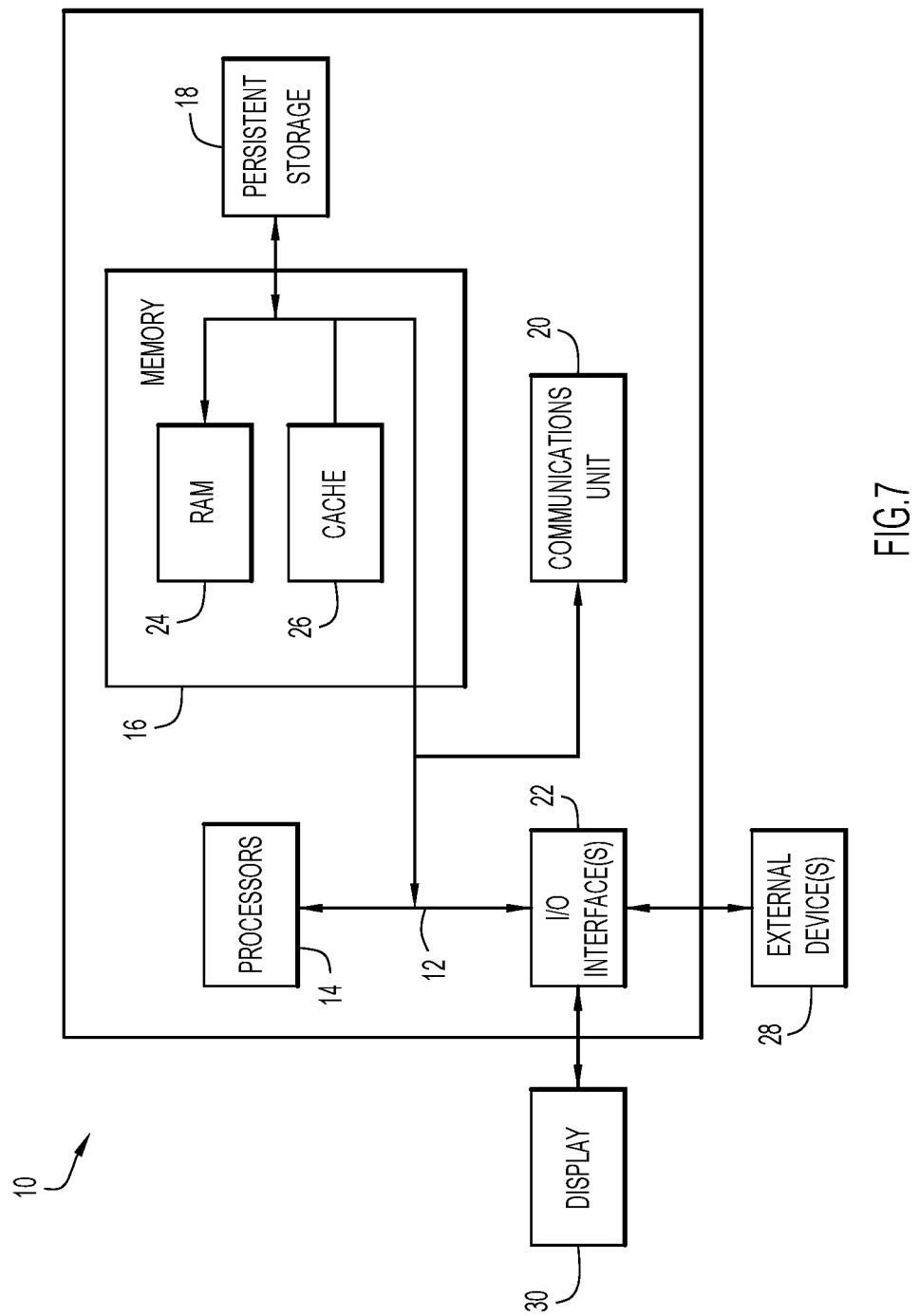
FIG. 7 is a block diagram depicting a computing device in accordance with an embodiment of the present invention.

FIG. 7 is a block diagram depicting components of a computer 10 suitable for executing the methods disclosed herein. Computer 10 may enable user device 110, database 120, and server 140 to perform data de-identification in accordance with embodiments of the present invention. It should be appreciated that FIG. 7 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data in any dataset and a common data model, whether de-identified not, may be stored within any conventional or other data structures (e.g., files, arrays, lists, stacks, queues, records, etc.) and may be stored in any desired storage unit (e.g., database, data or other repositories, queue, etc.) The data transmitted between user device 110, database 120, and server 140 may include any desired format and arrangement, and may include any quantity of any types of fields of any size to store the data. The definition and data model for any datasets and common data models may indicate the overall structure in any desired fashion (e.g., computer-related languages, graphical representation, listing, etc.).

Data in a dataset or common data model, such as relational data, trajectory data, sequence data, and transaction data, may include any information provided by user device 110, database 120, and storage 180. Data in a dataset or common data model may include any desired format and arrangement, and may include any quantity of any types of fields of any size to store any desired data. The fields may indicate the presence, absence, actual values, or any other desired characteristics of the data of interest (e.g., quantity, value ranges, etc.). Data in a dataset or common data model may include all or any desired portion (e.g., any quantity of specific fields) of personal information (PI) or other data of interest within a given implementation or system. Data in a dataset or common data model may indicate the overall structure in any desired fashion (e.g., computer-related languages, graphical representation, listing, etc.). The fields for the dataset or fields and tables in a common data model may be selected automatically (e.g., based on metadata, common or pre-defined models or structures, etc.) or manually (e.g., pre-defined, supplied by a data owner, etc.) in any desired fashion for a particular implementation or system. Metadata (e.g., for field selection, common model, etc.) may include any suitable information providing a description of fields or information (e.g., description of content, data type, etc.).

The data in a dataset or common data model may include any data collected about entities by any collection means, any combination of collected information, any information derived from analyzing collected information, and any combination data before or after de-identification.

The present invention embodiments may employ any number of any type of user interface (e.g., Graphical User Interface (GUI), command-line, prompt, etc.) for obtaining or providing information (e.g., data in a dataset or common data model), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for generation and analysis of various types of data, even in the absence of that data. For example, present invention embodiments may be utilized for any types of data interest (e.g, sensitive data (personal information (PI) including information pertaining to patients, customers, suppliers, citizens, and/or employees, etc.), non-sensitive data, data that may become unavailable (e.g., data that is subject to deletion after retention for a minimum time interval (e.g., information subject to various regulations, etc.), information that becomes unavailable due to system outage, power failure, or other data loss, etc.), etc.). Further, present invention embodiments may generate and utilize any quantity of data regarding entities of interest.

It will be appreciated that the embodiments described above and illustrated in the drawings represent only a few of the many ways of implementing embodiments for de-identifying data across different data sources using a common model.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., data model module 150, vulnerability identification module 160, de-identification module 170, etc.). These systems may include any types of monitors and input devices (e.g., keyboard, mouse, voice recognition, etc.) to enter and/or view information.

It is to be understood that the software (e.g., client software, server software, communication software, data model module 150, vulnerability identification module 160, and de-identification module 170) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., data model module 150, vulnerability identification module 160, and de-identification module 170) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data in a dataset or a common data model). The database system may be implemented by any number of any conventional or other databases, data stores or storage structures (e.g., files, databases, data structures, data or other repositories, etc.) to store information (e.g., data in a dataset or a common data model). The database system may be included within or coupled to the server and/or client systems. The database systems and/or storage structures may be remote from or local to the computer or other processing systems, and may store any desired data (e.g., data in a dataset or common data model).

The present invention embodiments may employ any number of any type of user interface (e.g., Graphical User Interface (GUI), command-line, prompt, etc.) for obtaining or providing information (e.g., personal data, personal identifying information, data stored in a dataset or a common data model, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer system for migrating and de-identifying data, the computer system comprising:
one or more computer processors;
one or more computer readable storage media;
program instructions stored on the one or more computer readable storage media for execution by at least one of the one or more computer processors, the program instructions comprising instructions to:
migrate data of a dataset to be de-identified to a common data model, wherein the common data model is configured to accommodate data comprising a plurality of different data types to be de-identified, and wherein the common data model comprises a plurality of tables to store corresponding direct identifiers in the dataset, quasi-identifiers in the dataset, sensitive attributes in the dataset, and links between attributes in the plurality of tables and corresponding domain generalization attribute hierarchies;
analyze the data in the common data model to automatically identify privacy vulnerabilities and determine corresponding data de-identification techniques and configuration options to be applied to the data;
apply the automatically determined data de-identification techniques to the data that resides in the common data model to address all the identified privacy vulnerabilities and produce de-identified data; and
migrate the de-identified data from the common data model back to the dataset.

2. The computer system of claim 1, wherein the plurality of tables of the common data model further store relational data, transaction data, sequential data, and location and mobility data.

3. The computer system of claim 1, wherein the attribute domain generalization hierarchies specify acceptable generalization operations of corresponding attributes of the data for de-identification.

4. The computer system of claim 1, wherein the instructions to analyze the data in the data model further comprise instructions to:
process the direct identifiers and quasi identifiers of the data according to privacy requirements; and
determine a privacy risk of results of the processing to identify an extent of protection of the identified privacy vulnerabilities.

5. The computer system of claim 3, wherein the instructions to analyze the data in the common data model further comprise instructions to generalize the data using the attribute domain generalization hierarchies.

6. The computer system of claim 1, wherein data is automatically migrated from the dataset to the common data model using schema matching techniques.

7. A computer program product for migrating and de-identifying data, the computer program product comprising one or more computer readable storage media collectively having program instructions embodied therewith, the program instructions executable by a computer to cause the computer to:
migrate data of a dataset to be de-identified to a common data model, wherein the common data model is configured to accommodate data comprising a plurality of different data types to be de-identified, and wherein the common data model comprises a plurality of tables to store corresponding direct identifiers in the dataset, quasi-identifiers in the dataset, sensitive attributes in the dataset, and links between attributes in the plurality of tables and corresponding domain generalization attribute hierarchies;

analyze the data in the common data model to automatically identify privacy vulnerabilities and determine corresponding data de-identification techniques and configuration options to be applied to the data;

apply the automatically determined data de-identification techniques to the data that resides in the common data model to address all the identified privacy vulnerabilities and produce de-identified data; and migrate the de-identified data from the common data model back to the dataset.

8. The computer program product of claim 7, wherein the plurality of tables of the common data model further store relational data, transaction data, sequential data, and location and mobility data.

9. The computer program product of claim 7, wherein the attribute domain generalization hierarchies specify acceptable generalization operations of corresponding attributes of the data for de-identification.

10. The computer program product of claim 7, wherein the instructions to analyze the data in the data model further comprise instructions to:

process the direct identifiers and quasi identifiers of the data according to privacy requirements; and determine a privacy risk of results of the processing to identify an extent of protection of the identified privacy vulnerabilities.

11. The computer program product of claim 9, wherein the instructions to analyze the data in the common data model further comprise instructions to generalize the data using the attribute domain generalization hierarchies.

12. The computer program product of claim 7, wherein data is automatically migrated from the dataset to the common data model using schema matching techniques.

* * * * *